(12) United States Patent
Raskar et al.

(10) Patent No.: US 9,131,159 B2
(45) Date of Patent: Sep. 8, 2015

(54) OPTICAL FIELD COMMUNICATION

(71) Applicant: Nokia Corporation, Espoo (FI)

(72) Inventors: Ramesh Raskar, Cambridge, MA (US);
Rajeswari Kannan, Bangalore (IN);
Pranav Mishra, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 98 days.

(21) Appl. No.: 13/930,522

(22) Filed: Jun. 28, 2013

(65) Prior Publication Data

US 2015/0002731 A1    Jan. 1, 2015

(51) Int. Cl.
*H04N 5/235* (2006.01)

(52) U.S. Cl.
CPC .................................. *H04N 5/2353* (2013.01)

(58) Field of Classification Search
None
See application file for complete search history.

(56) References Cited

U.S. PATENT DOCUMENTS

| | | | |
|---|---|---|---|
| 6,933,956 B2* | 8/2005 | Sato et al. | 348/211.2 |
| 2008/0297615 A1* | 12/2008 | Kagawa et al. | 348/222.1 |
| 2009/0295976 A1* | 12/2009 | Choi | 348/333.11 |
| 2013/0194458 A1* | 8/2013 | Nayar et al. | 348/241 |
| 2013/0272717 A1* | 10/2013 | Deguchi et al. | 398/154 |
| 2014/0093234 A1* | 4/2014 | Roberts et al. | 398/25 |
| 2014/0294398 A1* | 10/2014 | Oshima et al. | 398/118 |

\* cited by examiner

*Primary Examiner* — Jason Flohre
(74) *Attorney, Agent, or Firm* — Harrington & Smith

(57) ABSTRACT

A method and apparatus for optical field communication, wherein incident light is spread on the surface of an image sensor with a diffuser element; a conventional digital image is captured with high exposure pixel rows of the image sensor; and the light intensity on two successive low exposure pixel rows of the image sensor is recorded. The recorded light intensities of the two successive low exposure pixel rows are compared; and in response to comparing the recorded light intensities of the two successive low exposure pixel rows, a value of a bit received via optical field communication is determined.

22 Claims, 5 Drawing Sheets

OPTICAL FIELD COMMUNICATION

TECHNICAL FIELD

The present application generally relates to optical field communication. In particular, although not exclusively, the application relates to optical field communication for augmented reality.

BACKGROUND

In a digital camera, light rays fall on an image sensor through the optics of the camera. The image sensor detects and records the intensity of light rays incident on each pixel of the image sensor. From the intensity data, an image or a photograph is created.

Modern image sensors provide an increasing number of pixels while the size and cost of the sensor remains reasonable. As the number of pixels, or the number of image sensors, increases, not all pixels are required to form a final image of high quality. Accordingly, versatile uses of the image sensor have been suggested. For example, methods of high dynamic range imaging and oversampling have exploited the high number of pixels available.

Concurrently with the development of image sensor technology, imaging has also developed into a social experience, and a camera is also used for purposes other than mere imaging, e.g. in navigation and social media. A rising trend in digital imaging is augmented reality and, accordingly, utilizing the image sensor for purposes of augmented reality is envisaged.

SUMMARY

Various aspects of examples of the invention are set out in the claims.

According to a first example aspect of the invention, there is provided an apparatus, comprising:
  a processor; and
  a camera unit comprising a rolling shutter and an image sensor; wherein the camera unit further comprises a diffuser element configured to spread light incident thereon on the surface of the image sensor; and the image sensor comprises alternate pixel rows configured for high and low exposure respectively; wherein
  the processor is configured to cause
    capturing a conventional digital image with the high exposure pixel rows;
    recording the light intensity on two successive low exposure pixel rows;
    comparing the recorded light intensities of the two successive low exposure pixel rows; and
    in response to comparing the recorded light intensities of the two successive low exposure pixel rows, determining a value of a bit received via optical field communication.

The processor may further be configured to cause repeating the comparing of the recorded light intensities of the two successive low exposure pixel rows for each low exposure pixel row of the image sensor.

The processor may further be configured to cause segmenting the captured conventional digital image into superpixels; and to cause comparing the recorded light intensities of the two successive low exposure pixel rows inside a superpixel.

The processor may further be configured to cause determining the value of the bit as a if the latter low exposure row has a higher intensity and as b if the latter low exposure row has a lower intensity, wherein the values of a and b are chosen from 1 and 0.

The diffuser element may cover a part of the aperture of the camera unit.

The diffuser element may be comprised in the optics of the camera unit.

The processor may further be configured to cause decoding the bits received via optical field communication into an augmented reality message.

The processor may further be configured to cause executing an application in response to the bits received.

The processor may further be configured to cause displaying information comprised in the bits received.

The apparatus may comprise one of a mobile phone, a smartphone, a camera, a tablet computer, an e-book reader, and a wearable electronic device.

The display may comprise a touch sensitive display.

The display may comprise a see through display.

The apparatus may comprise a plurality of camera units and at least one of the camera units may comprise optics comprising a diffuser element configured to spread light incident thereon on the whole surface of the image sensor.

According to a second example aspect of the invention, there is provided a method, comprising:
  spreading incident light on the surface of an image sensor with a diffuser element;
  capturing a conventional digital image with high exposure pixel rows of the image sensor;
  recording the light intensity on two successive low exposure pixel rows of the image sensor;
  comparing the recorded light intensities of the two successive low exposure pixel rows; and
  in response to comparing the recorded light intensities of the two successive low exposure pixel rows, determining a value of a bit received via optical field communication.

The comparing of the recorded light intensities of the two successive low exposure pixel rows may be repeated for each low exposure pixel row of the image sensor.

The captured conventional digital image may be segmented into superpixels; and the recorded light intensities of the two successive low exposure pixel rows may be compared inside a superpixel.

The value of the bit may be determined as a if the latter low exposure row has a higher intensity and as b if the latter low exposure row has a lower intensity, wherein the values of a and b are chosen from 1 and 0.

The diffuser element may cover a part of the aperture of a camera unit.

The bits received via optical field communication may be decoded into an augmented reality message.

An application may be executed by a processor in response to the bits received.

Information comprised in the bits received may be displayed on a display.

The method may be carried out in one of a mobile phone, a smartphone, a camera, a tablet computer, an e-book reader, and a wearable electronic device.

According to a third example aspect of the invention, there is provided a computer program, comprising:
  code for performing a method of an example aspect of the invention,
  when the computer program is run on a processor.

According to a fourth example aspect of the invention, there is provided a memory medium comprising the computer program of the third example aspect of the invention.

According to a fifth example aspect of the invention, there is provided an apparatus, comprising:
a housing;
a display;
a memory;
a processor; and
a camera unit comprising a rolling shutter and an image sensor; wherein the camera unit further comprises a diffuser element configured to spread light incident thereon on the surface of the image sensor; and the image sensor comprises alternate pixel rows configured for high and low exposure respectively; wherein
the processor is configured to cause
capturing a conventional digital image with the high exposure pixel rows;
recording the light intensity on two successive low exposure pixel rows;
comparing the recorded light intensities of the two successive low exposure pixel rows; and
in response to comparing the recorded light intensities of the two successive low exposure pixel rows, determining a value of a bit received via optical field communication.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
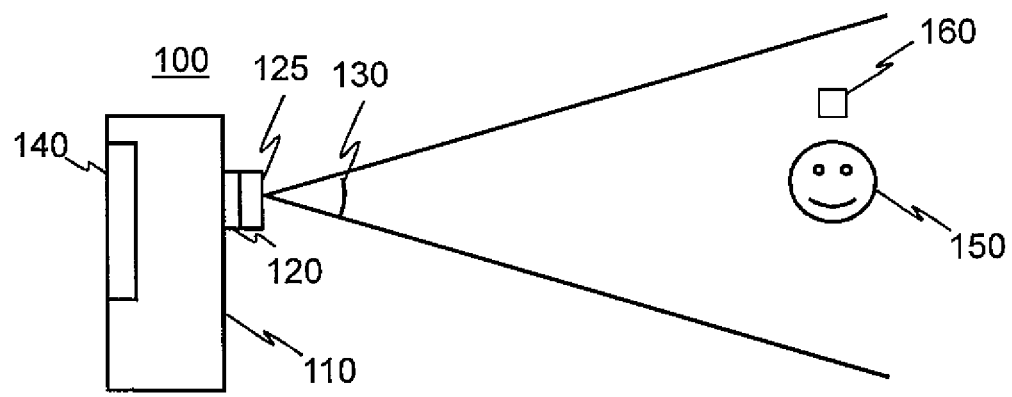
FIG. 1 shows a schematic system for use as a reference with which some example embodiments can be explained.

FIG. 1 shows a schematic system 100 for use as a reference with which some example embodiments can be explained. The system 100 comprises an electronic device 110 such as a camera phone, camera, smartphone, gaming device, wearable electronic device, personal digital assistant or a tablet computer having a camera unit 120 that is capable of capturing images with a field of view 130. The device 110 further comprises a display 140. FIG. 1 also shows an image object 150 that is being imaged by the camera unit 120. Furthermore, FIG. 1 shows an image object 160 configured for optical field communication. In an example embodiment, the object 160 is e.g. a blinking led attached for example to a billboard or to an electronic device of a person.

Figure 2:
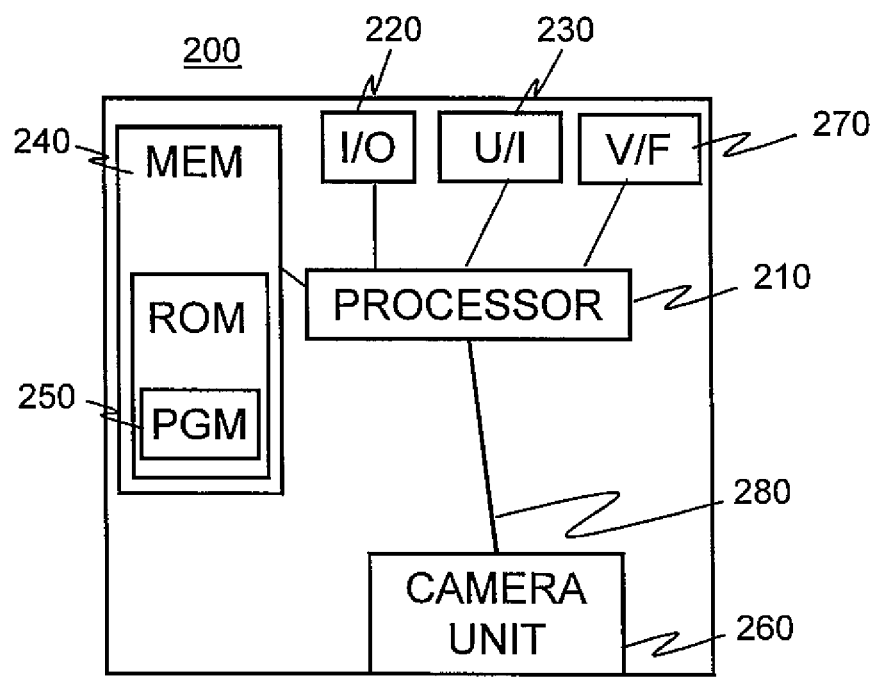
FIG. 2 shows a block diagram of an apparatus of an example embodiment.

FIG. 2 shows a block diagram of an apparatus 200 of an example embodiment. The apparatus 200 is suited for operating as the device 110. In an example embodiment, the apparatus 200 comprises a communication interface 220, a host processor 210 coupled to the communication interface module 220, and a memory 240 coupled to the host processor 210.

The memory 240 comprises a work memory and a non-volatile memory such as a read-only memory, flash memory, optical or magnetic memory. In the memory 240, typically at least initially in the non-volatile memory, there is stored software 250 operable to be loaded into and executed by the host processor 210. The software 250 may comprise one or more software modules and can be in the form of a computer program product that is software stored in a memory medium. The apparatus 200 further comprises a camera unit 260 and a viewfinder 270 each coupled to the host processor 210. The camera unit 260 and the processor 210 are connected via a camera interface 280. The camera unit is configured for conventional digital imaging and optical field communication.

Figure 3:
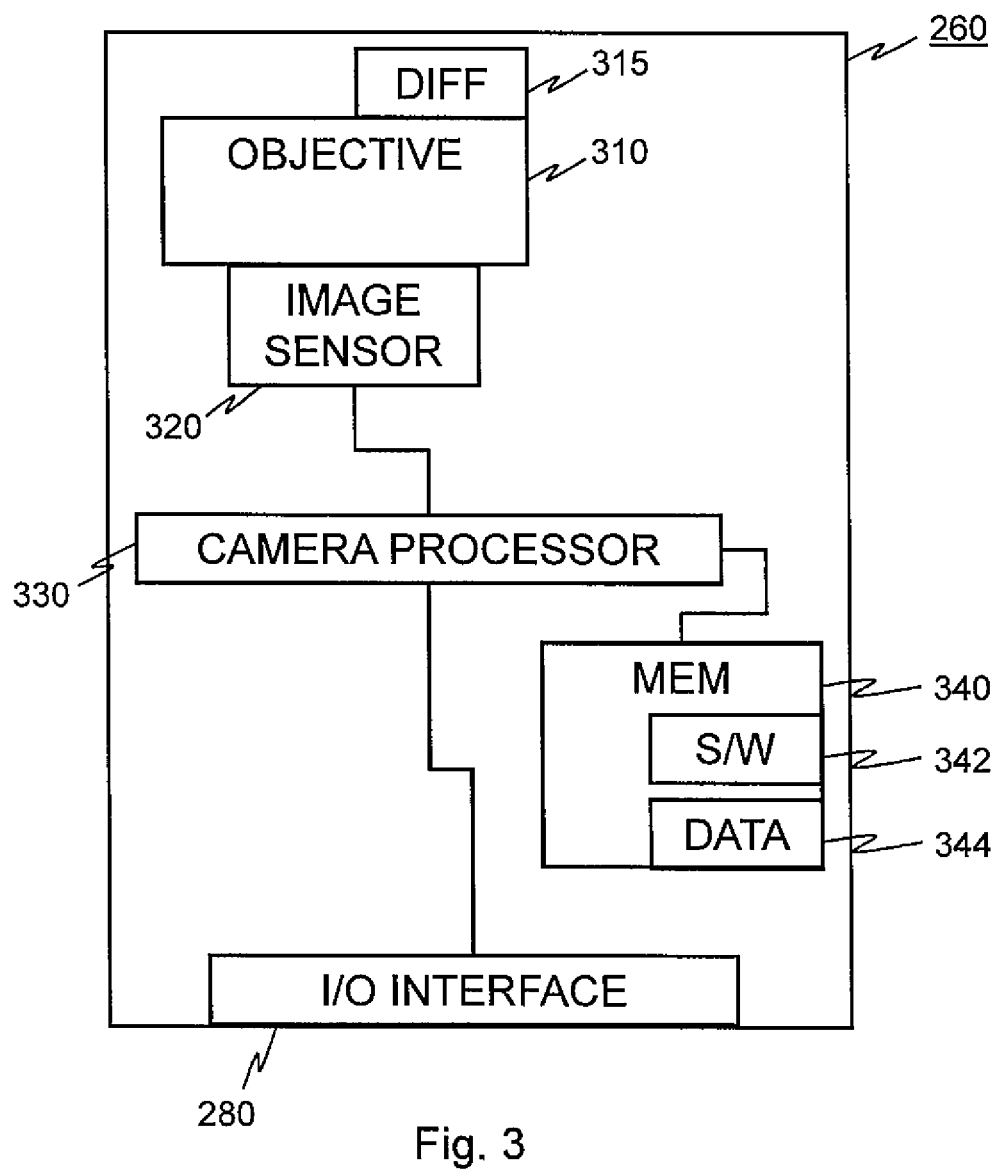
FIG. 3 shows a block diagram of a camera unit of an example embodiment.

Term host processor refers to a processor in the apparatus 200 in distinction of one or more processors in the camera unit 260, referred to as camera processor(s) 330 in FIG. 3. Depending on implementation, different example embodiments share processing of image and/or optical field communication and control of the camera unit 260 differently between the camera unit and one or more processors outside the camera unit. Also, the processing is performed on the fly in an example embodiment and with buffering in another example embodiment. It is also possible that a given amount of images or image information can be processed on the fly and after than buffered operation mode is used.

It shall be understood that any coupling in this document refers to functional or operational coupling; there may be intervening components or circuitries in between coupled elements unless expressly otherwise described.

The communication interface module 220 is configured to provide local communications over one or more local links. The links may be wired and/or wireless links. The communication interface 220 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The communication interface 220 may be integrated into the apparatus 200 or into an adapter, such as a card that may be inserted into a suitable slot or port of the apparatus 200. While FIG. 2 shows one communication interface 220, the apparatus may comprise a plurality of communication interfaces 220.

The host processor 210 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one host processor 210, but the apparatus 200 may comprise a plurality of host processors.

As mentioned in the foregoing, the memory 240 may comprise non-transitory non-volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, or a smart card. In some example embodiments, only volatile or non-volatile memory is present in the apparatus 200. Moreover, in some example embodiments, the apparatus comprises a plurality of memories. In some example embodiments, various elements are integrated. For instance, the memory 240 can be constructed as a part of the apparatus 200 or inserted into a slot or a port. Further still, the memory 240 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, or ciphering/deciphering circuitry. Additionally, the apparatus 200 may comprise a housing and a disposable or rechargeable battery (not shown) for powering the apparatus if external power supply is not available. In a further example embodiment, the apparatus 200 is a wearable electronic device, such as eyeglasses, and comprises a see-through display (not shown). In a further example embodiment, a display and a camera unit are integrated, i.e. a display camera structure is provided.

It is also useful to realize that the term apparatus is used in this document with varying scope. In some of the broader claims and examples, the apparatus may refer to only a subset of the features presented in FIG. 2 or even be implemented without any one of the features of FIG. 2. In an example embodiment term apparatus refers to the processor 210, an input of the processor 210 configured to receive information from the camera unit and an output of the processor 210 configured to provide information to the viewfinder. In one example embodiment, the apparatus refers to a device that receives image information from the image sensor via a first input and produces sub-images to a second input of an image processor, which image processor is any circuitry that makes use of the produced sub-images. For instance, the image processor may comprise the processor 210 and the device in question may comprise the camera processor 330 and the camera interface 280 shown in FIG. 3.

FIG. 3 shows a block diagram of a camera unit 260 of an example embodiment. The camera unit 260 comprises optics such as an objective 310, an image sensor 320, a camera processor 330, a memory 340 comprising data 344 and software 342 with which the camera processor 330 can manage operations of the camera unit 260. In an example embodiment, the optics, i.e. the objective 310, comprises a rolling shutter (not shown) and a diffuser 315 covering a part of the camera objective 310 and therethrough a part of the aperture of the camera unit. The camera processor 330 operates as an image and optical field communication processing circuitry of an example embodiment. An input/output or camera interface 280 is also provided to enable exchange of information between the camera unit 260 and the host processor 210.

In an example embodiment, the software 342 stored in the memory comprises applications or programs or instructions for operating the camera unit in a conventional camera mode and for optical field communication. In an example embodiment, he data 344 stored in the memory 340 comprises parameters for use in conventional photography and in optical field communication.

The image sensor 320 is, for instance, a charge-coupled device (CCD) or complementary metal oxide semiconductor (CMOS) unit. In case of a CMOS unit, the image sensor 320 can also contain built-in analog-to-digital implemented on common silicon chip with the image sensor 320. In an alternative example embodiment, a separate analog-to-digital (A/D) conversion is provided between the image sensor 320 and the camera processor 330. In addition to the conventional image processing and the calculations or operations needed in light field recording, the camera processor 330 takes care in example embodiments of one or more of the following functions: pixel color interpolation; white balance correction; edge enhancement; anti-aliasing of images; vignetting correction; combining of subsequent images for high dynamic range imaging; bayer reconstruction filtering; chromatic aberration correction; dust effect compensation; image stabilization.

In an example embodiment, the apparatus 200 further comprises a user interface (U/I) 230. The user interface comprises one or more elements with which the user operates the apparatus 200 and the camera unit 260. Said elements comprise for example a shutter button, menu buttons and a touch screen. The shutter button and the menu buttons may be hardware buttons or for example buttons displayed on a touch screen.

In a further example embodiment, the apparatus 200 or the camera unit 260 comprises an image stabilizer (not shown). In an example embodiment the image stabilizer is an optical image stabilizer configured to move a lens or several lenses. Alternatively, the image stabilizer is configured to move the image sensor 320 or a mirror. In a further example embodiment the image stabilizer is implemented with a software image stabilization method. It is also possible to use more than one different image stabilizing techniques and in one example embodiment, two or more of the mentioned image stabilization techniques are combined. A skilled person appreciates that in a further example embodiment, the apparatus 200 and/or the camera unit 260 comprises further elements not shown in the image.

Figure 4A:
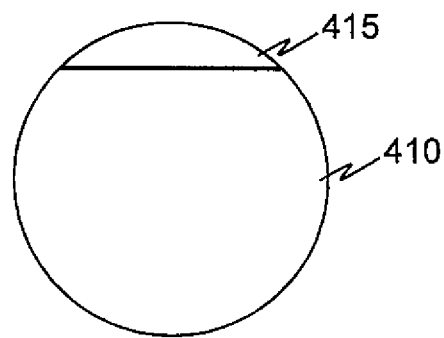
FIG. 4a shows a schematic representation of a front view of the camera unit of an apparatus according to an example embodiment.
Figure 4B:
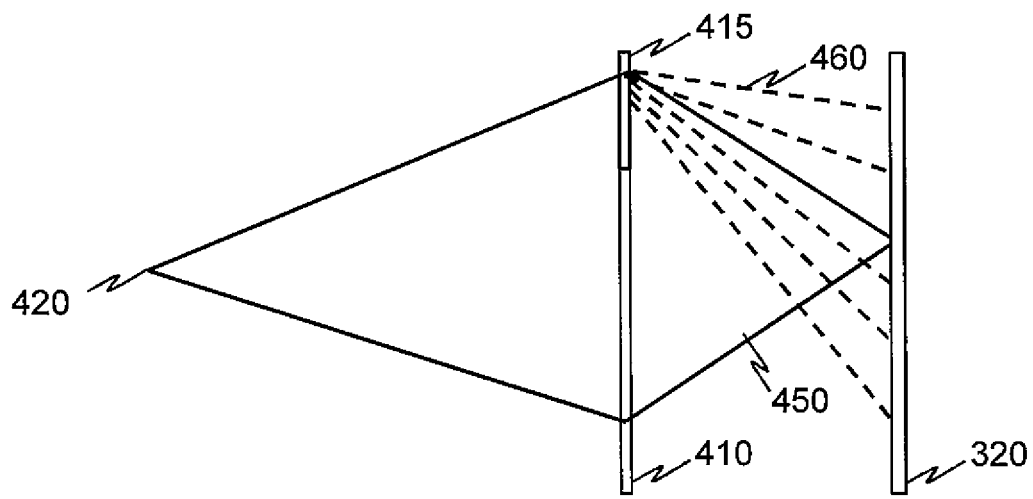
FIG. 4b shows a schematic representation of a side view of the camera unit of an apparatus according to an example embodiment.

FIG. 4a shows a schematic representation of a front view of the camera unit of an apparatus according to an example embodiment. A part of the camera objective or optics 410, e.g. of the surface of the camera lens, comprises a diffuser element 415. The size of the surface covered with the diffuser element is chosen in accordance with the specifications of the camera unit, or in an example embodiment, in accordance with the specifications of several camera units. FIG. 4b shows a schematic representation of a side view of the camera unit of an apparatus according to an example embodiment. The aperture 410 and the diffuser element 415 are shown. Light originating from a point source, i.e. from any object in the field of view of the camera unit is focused 450 by the objective 410 onto the surface of the image sensor 320. Light originating from the point source 420 and traversing the diffuser element 415 is spread substantially evenly across the sensor surface.

In a further example embodiment, the apparatus 200 comprises a plurality of camera units, i.e. a plurality of image sensors 320 and objectives 310. The apparatus may comprise for example two camera units or an array of camera units. In an example embodiment with two camera units, the objective of one camera unit comprises the diffuser element as shown in FIGS. 4a and 4b and the other camera unit is a conventional camera unit. Furthermore, with an array of camera unit, the objective of one or some camera units comprises the diffuser element as shown in FIGS. 4a and 4b and the other camera units are conventional camera units. In a further example embodiment, the apparatus 200 comprises a camera unit comprising catadiatropic optics, i.e. optics comprising both lenses and mirrors, e.g. for providing multiple views of an image object. In an example embodiment, one of the components of the catadioptric optics comprises the diffuser element, for example a diffuser coating is applied to a mirror. In a still further example embodiment, the apparatus comprises a see-through display comprising the camera unit and a diffuser element is applied to a part of the display camera surface.

Figure 5:
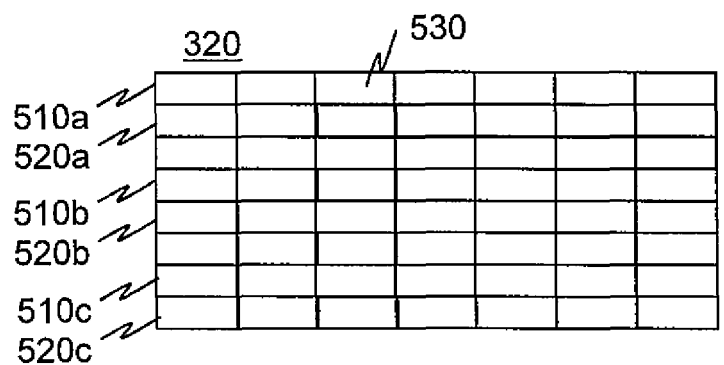
FIG. 5. shows a schematic representation of an image sensor of a camera unit of an apparatus according to an example embodiment.

FIG. 5. shows a schematic representation of an image sensor 320 of a camera unit of an apparatus according to an example embodiment. The image sensor 320 comprises an array, or matrix of pixels 530, i.e. image sensor elements. The pixels 530 are arranged in rows, or sensor lines, 510a-c,520a-c. In an example embodiment the rows 510a-c,520a-c are configured for alternate row exposure, i.e. each row 510a-c, 520a-c is either configured for high exposure or for low exposure. In an example embodiment, the rows 510a-c are configured for high exposure and to form a conventional image and the rows 520a-c are configured for low exposure and to detect the light spread evenly across the sensor surface by the diffuser element 415. It is noted, that in a further example embodiment, the division of the rows into high and low exposure is different from every other row being for high and low exposure, respectively. The camera unit according to an example embodiment comprises a rolling shutter, i.e. the rows 510a-c,520a-c are read, recorded or scanned row after row with a certain frequency. Accordingly, if the intensity of the light incident on the sensor surface changes, the intensity recorded from subsequent rows has a different value. Optical field communication is for example carried out with a blinking light source, such as for example a light emitting diode (led). In an example embodiment, the scanning frequency of the rolling shutter is adjusted in such a way as to read the intensity values of the rows in such a way as to enable decoding or demodulating of the optical field communication data from the blinking light source as hereinafter described with reference to FIGS. 6 and 7. In a further example embodiment, the adjustment of the rolling shutter is carried out by adjusting the frame rate of the camera unit. In an example embodiment, the optical field communication data, i.e. the bits received, comprises an augmented reality message, such as an identifier of a user or commercial information form a business.

Figure 6:
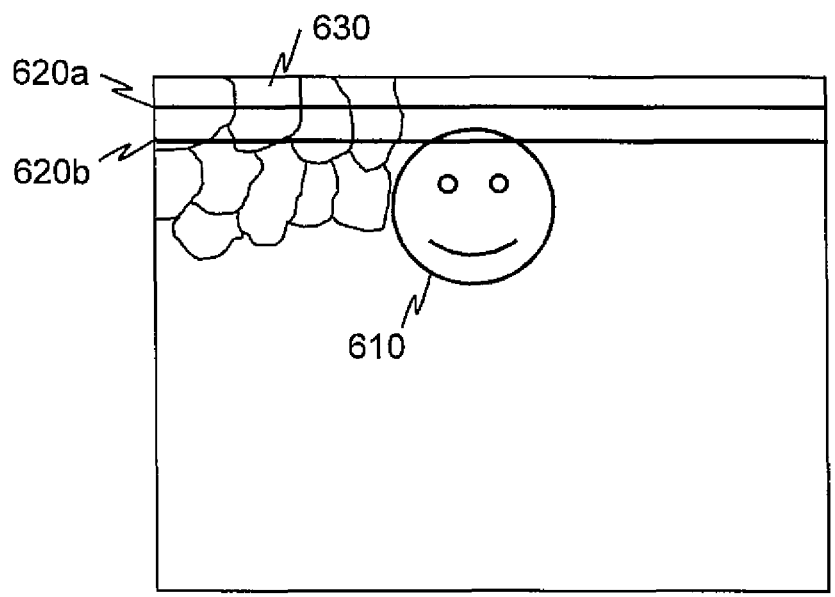
FIG. 6. shows a schematic representation of an image formed on an image sensor of a camera unit of an apparatus according to an example embodiment.

FIG. 6. shows a schematic representation of an image formed on an image sensor of a camera unit of an apparatus according to an example embodiment. The high exposure sensor rows 510a-c are used to form a conventional digital image comprising image objects 610. In an example embodiment, the conventional digital image is segmented or divided into superpixels using a suitable algorithm executed by a processor of the apparatus according to an example embodiment. The low exposure rows 620a,620b are read using the rolling shutter one after another in order to decode or demodulate optical field communication data received from a light source in the field of vision of the camera unit and spread across the sensor surface by the diffuser element.

Figure 7:
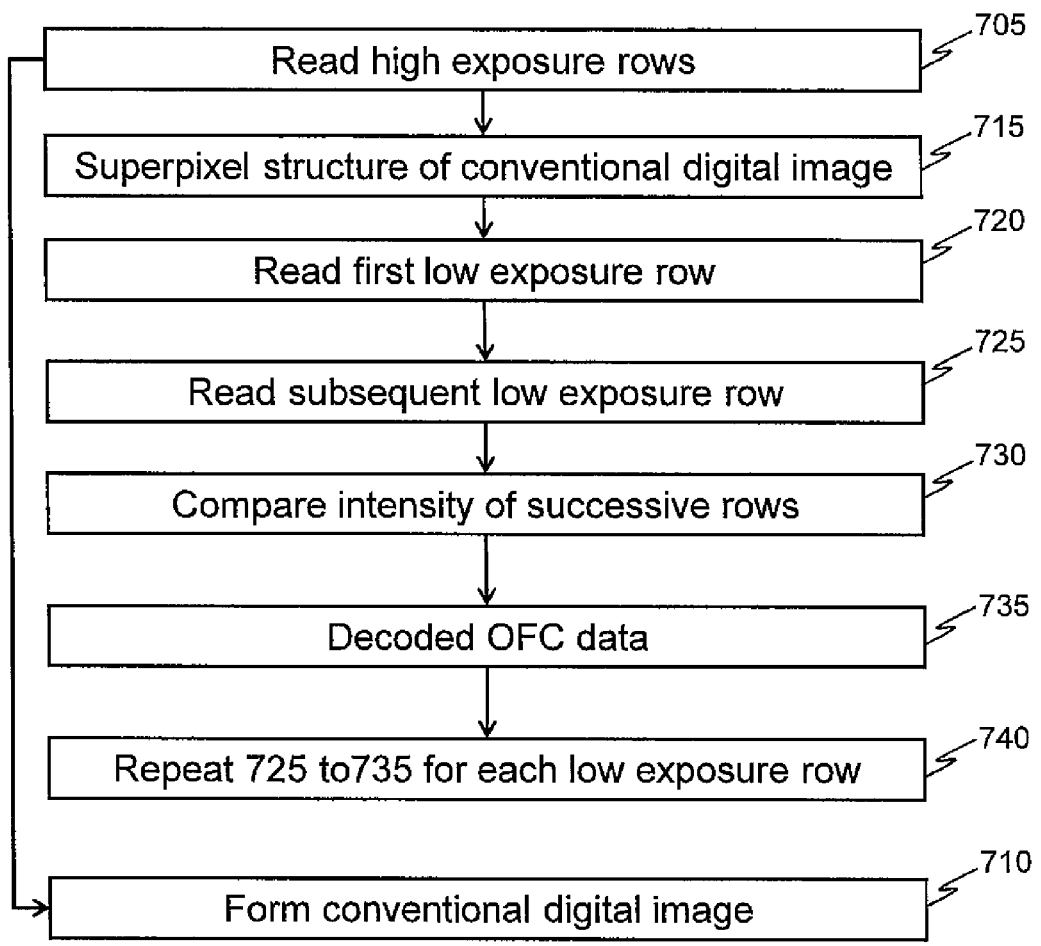
FIG. 7 shows a flow diagram of a method of an example embodiment.

FIG. 7 shows a flow diagram of a method of an example embodiment. It is to be noted that the processor or processors of the apparatus according to an example embodiment is configured to carry out the steps of the method according to an example embodiment. The high exposure rows are read at 705 and a conventional digital image is formed at 710. In an example embodiment, the image is segmented into superpixels, i.e. a superpixel structure is formed at 715. At 720 and 725 a first and a subsequent low exposure row is scanned, and at 730 the recorded intensity of two successive low exposure rows is compared. In an example embodiment, the intensity comparison is carried out inside a superpixel so that any edge formation in the image does not interfere with the comparison. In an example embodiment, based on the comparison of the intensity of successive low exposure rows, the data sent with optical field communication is decoded at 735, i.e. if the intensity increases from the first row to the subsequent row, it is decided that the value of the bit received via optical field communication is a, and if the intensity decreases from the first row to the subsequent row, it is decided that the value of the bit received via optical field communication is b. In an example embodiment the values a and b of the bit are chosen from 0 and 1. For example, if the intensity increases from the first row to the subsequent row, the bit being transmitted with optical field communication is for example one and if the intensity decreases from the first row to the subsequent row, the bit being transmitted with optical field communication is for example zero. The steps 725 to 735 are repeated for each low exposure row of the image sensor 320 at 740, and accordingly, the information sent with optical field communication is decoded or demodulated and in an example embodiment, processed further. In a further example embodiment, the information comprises an augmented reality message and the processor is further configured to act upon the message, for example by executing an application automatically or displaying information on a display.

Some use cases relating to given example embodiments of optical field communication are presented in the following. In a first use case, two persons are using wearable eyeglasses comprising a blinking led for optical field communication and an image sensor and optics according to an example embodiment of the invention as hereinbefore described. The first person sends for example an unique id with the led blinks using optical field communication and the eyeglasses of the second user read and decode this id and for example execute a messaging application based on the unique id, for example a social media username, that was received via optical field communication.

In a second use case, a user of a mobile device wishes to receive extra information from a source such as a billboard or an info stand. The camera unit of the mobile phone according to an example embodiment is pointed at the billboard which has a source of optical field communication, e.g. a blinking light source. The mobile device decodes the information and shows it to the user of the mobile device on the display, for example on the viewfinder view of the camera, wherein a part of the display is reserved for the received information.

In a third use case, a user of a mobile device is using the camera unit as a navigation aid, for example while sightseeing. The camera unit receives information from any optical field communication device in the field of view and shows this on the display for example as appropriate tags showing for example points of interest with updated information.

In a fourth use case, an electronic device used in a vehicle for example for navigation purposes comprises a camera unit according to an example embodiment. The camera unit receives information via optical field communication e.g. on traffic conditions from optical field communication devices provided for example in conjunction with traffic lights.

Without in any way limiting the scope, interpretation, or application of the claims appearing below, a technical effect of one or more of the example embodiments disclosed herein is to enable optical field communication without compromising digital image quality. Another technical effect of one or more of the example embodiments disclosed herein is to effectively utilize all pixels of an image sensor. Another technical effect of one or more of the example embodiments disclosed herein is to easily provide augmented reality information using the camera unit. Still a further technical effect is to provide an optical field communication solution applicable to any camera unit.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while example embodiments of the invention have been described hereinbefore, these descriptions should not be viewed in a limiting sense. Rather, there are several variations and modifications which may be made without departing from the scope of the present invention as defined in the appended claims.

The invention claimed is:

1. An apparatus, comprising:
a processor; and
a camera unit comprising a rolling shutter and an image sensor; wherein the camera unit further comprises a diffuser element configured to spread light incident thereon on the surface of the image sensor; and the image sensor comprises alternate pixel rows configured for high and low exposure respectively; wherein
the processor is configured to cause capturing a conventional digital image with the high exposure pixel rows;
recording the light intensity on two successive low exposure pixel rows;
comparing the recorded light intensities of the two successive low exposure pixel rows; and
in response to comparing the recorded light intensities of the two successive low exposure pixel rows, determining a value of a bit received via optical field communication;
wherein the processor is further configured to cause segmenting the captured conventional digital image into superpixels; and
to cause comparing the recorded light intensities of the two successive low exposure pixel rows inside a superpixel.

2. The apparatus of claim 1, wherein the processor is further configured to cause repeating the comparing of the recorded light intensities of the two successive low exposure pixel rows for each low exposure pixel row of the image sensor.

3. The apparatus of claim 1, wherein the processor is further configured to cause determining the value of the bit as a if the latter low exposure row has a higher intensity and as b if the latter low exposure row has a lower intensity, wherein the values of a and b are chosen from 1 and 0.

4. The apparatus of claim 1, wherein the diffuser element covers a part of the aperture of the camera unit.

5. The apparatus of claim 1, wherein the diffuser element is comprised in the optics of the camera unit.

6. The apparatus of claim 1, wherein the processor is further configured to cause decoding the bits received via optical field communication into an augmented reality message.

7. The apparatus of claim 1, wherein the processor is further configured to cause executing an application in response to the bits received.

8. The apparatus of claim 1, wherein the processor is further configured to cause displaying information comprised in the bits received.

9. The apparatus of claim 1, wherein the apparatus comprises one of a mobile phone, a smartphone, a camera, a tablet computer, an e-book reader, and a wearable electronic device.

10. The apparatus of claim 1, wherein the display comprises a touch sensitive display.

11. The apparatus of claim 1, wherein the display comprises a see through display.

12. The apparatus of claim 1, wherein the apparatus comprises a plurality of camera units and at least one of the camera units comprises optics comprising a diffuser element configured to spread light incident thereon on the whole surface of the image sensor.

13. A method, comprising:
spreading incident light on the surface of an image sensor with a diffuser element;
capturing a conventional digital image with high exposure pixel rows of the image sensor;
recording the light intensity on two successive low exposure pixel rows of the image sensor;
comparing the recorded light intensities of the two successive low exposure pixel rows; and
in response to comparing the recorded light intensities of the two successive low exposure pixel rows, determining a value of a bit received via optical field communication;
wherein the captured conventional digital image is segmented into superpixels; and
the recorded light intensities of the two successive low exposure pixel rows are compared inside a superpixel.

14. The method of claim 13, wherein the comparing of the recorded light intensities of the two successive low exposure pixel rows is repeated for each low exposure pixel row of the image sensor.

15. The method of claim 13, wherein the value of the bit is determined as a if the latter low exposure row has a higher intensity and as b if the latter low exposure row has a lower intensity, wherein the values of a and b are chosen from 1 and 0.

16. The method of claim 13, wherein the diffuser element covers a part of the aperture of a camera unit.

17. The method of claim 13, wherein the bits received via optical field communication are decoded into an augmented reality message.

18. The method of claim 13, wherein an application is executed by a processor in response to the bits received.

19. The method of claim 13, wherein information comprised in the bits received is displayed on a display.

20. The method of claim 13, wherein the method is carried out in one of a mobile phone, a smartphone, a camera, a tablet computer, an e-book reader, and a wearable electronic device.

21. A non-transitory computer readable medium embodied with a computer program comprising code for performing the method of claim 13.

22. An apparatus, comprising;
a housing;
a display;
a memory;
a processor; and
a camera unit comprising a rolling shutter and an image sensor; wherein the camera unit further comprises a diffuser element configured to spread light incident thereon on the surface of the image sensor; and the image sensor comprises alternate pixel rows configured for high and low exposure respectively; wherein
the processor is configured to cause capturing a conventional digital image with the high exposure pixel rows;
recording the light intensity on two successive low exposure pixel rows;

comparing the recorded light intensities of the two successive low exposure pixel rows; and
in response to comparing the recorded light intensities of the two successive low exposure pixel rows, determining a value of a bit received via optical field communication;
wherein the captured conventional digital image is segmented into superpixels; and
the recorded light intensities of the two successive low exposure pixel rows are compared inside a superpixel.

* * * * *